(12) United States Patent
Kim et al.

(10) Patent No.: US 12,078,807 B2
(45) Date of Patent: Sep. 3, 2024

(54) DISPLAY DEVICE

(71) Applicant: Samsung Display Co., LTD., Yongin-si (KR)

(72) Inventors: Sang-Ho Kim, Gwangmyeong-si (KR); Soo Min Baek, Hwaseong-si (KR); Ju Youn Son, Cheonan-si (KR); Ji Won Lee, Suwon-si (KR); Cheon Myeong Lee, Seoul (KR); Ju Hwa Ha, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 17 days.

(21) Appl. No.: 17/879,257

(22) Filed: Aug. 2, 2022

(65) Prior Publication Data
US 2023/0081079 A1    Mar. 16, 2023

(30) Foreign Application Priority Data
Sep. 15, 2021   (KR) .......................... 10-2021-0123474

(51) Int. Cl.
G02B 27/01      (2006.01)
G02B 30/27      (2020.01)
(52) U.S. Cl.
CPC ..... *G02B 27/0172* (2013.01); *G02B 27/0176* (2013.01); *G02B 2027/0138* (2013.01)
(58) Field of Classification Search
USPC .......................................................... 345/7
See application file for complete search history.

(56) References Cited

U.S. PATENT DOCUMENTS

| 9,380,287 | B2 | 6/2016 | Nistico et al. |
| 10,607,075 | B2 | 3/2020 | Gustafsson et al. |
| 10,859,843 | B1 | 12/2020 | Tempel et al. |
| 2013/0050432 | A1* | 2/2013 | Perez ..................... G06F 3/011 348/47 |
| 2013/0070146 | A1* | 3/2013 | Imamura .............. H04N 13/218 348/335 |
| 2014/0362110 | A1* | 12/2014 | Stafford ................ G06T 19/006 345/633 |
| 2016/0240013 | A1* | 8/2016 | Spitzer ............... G02B 27/0172 |
| 2016/0379606 | A1* | 12/2016 | Kollin .................. G03H 1/2294 345/428 |
| 2017/0038590 | A1* | 2/2017 | Jepsen ............... G02B 27/0101 |
| 2017/0177075 | A1* | 6/2017 | Zhang .................... G06V 40/19 |
| 2017/0269367 | A1* | 9/2017 | Qin ........................ G06F 1/163 |
| 2017/0322420 | A1* | 11/2017 | Machida ............. G02B 26/101 |
| 2018/0330652 | A1* | 11/2018 | Perreault ................. G06T 3/40 |
| 2019/0041644 | A1* | 2/2019 | Abele ................ G02B 27/0172 |

(Continued)

FOREIGN PATENT DOCUMENTS

| JP | 6821574 | 1/2021 |
| KR | 10-1455714 | 11/2014 |

(Continued)

*Primary Examiner* — Chineyere D Wills-Burns
(74) *Attorney, Agent, or Firm* — KILE PARK REED & HOUTTEMAN PLLC

(57) ABSTRACT

A display device includes a display part including a plurality of pixels; a lens part disposed on the display part; and a plurality of optical devices overlapping an edge of the display part in a plan view and disposed at an edge of the lens part, wherein light from the outside of the display part is incident on the plurality of optical devices.

19 Claims, 7 Drawing Sheets

(56) References Cited

U.S. PATENT DOCUMENTS

| | | | |
|---|---|---|---|
| 2019/0204599 A1* | 7/2019 | Abbott | G06T 19/006 |
| 2019/0250707 A1* | 8/2019 | Kondo | G02B 27/0093 |
| 2019/0318677 A1* | 10/2019 | Lu | G02B 27/0093 |
| 2020/0026084 A1* | 1/2020 | Kwon | G02B 27/143 |
| 2020/0312832 A1* | 10/2020 | Chi | H10K 59/353 |
| 2021/0011284 A1* | 1/2021 | Andreev | G02B 27/0179 |
| 2021/0080720 A1* | 3/2021 | Zhao | G02F 1/13718 |
| 2021/0373336 A1* | 12/2021 | Price | G02B 27/0172 |

FOREIGN PATENT DOCUMENTS

| | | |
|---|---|---|
| KR | 10-2016-0022927 | 3/2016 |
| KR | 10-2019-0104218 | 9/2019 |
| WO | 2015/077718 | 5/2015 |

\* cited by examiner

DISPLAY DEVICE

CROSS-REFERENCE TO RELATED APPLICATION(S)

This application claims priority to and the benefit of Korean Patent Application No. 10-2021-0123474 under 35 U.S.C. § 119, filed in the Korean Intellectual Property Office (KIPO) on Sep. 15, 2021, the entire contents of which are incorporated herein by reference.

BACKGROUND

1. Technical Field

The disclosure relates to a display device, and more particularly, to a head mounted display device.

2. Description of the Related Art

A head mounted display (HMD) is rapidly developing.

The head-mounted display provides a three-dimensional effect and has a wide viewing angle, which increases the sense of presence and immersion, and is used for realization of virtual reality or augmented reality.

On the other hand, when observing an image by wearing the head mounted display on the user's head, it is necessary to observe the outside together.

The above information disclosed in this Background section is only for enhancement of understanding of the background of the described technology, and therefore it may contain information that does not form the prior art that is already known in this country to a person of ordinary skill in the art.

SUMMARY

Embodiments are to provide a display device that may observe the outside without interfering with an image of a head mounted display.

However, the problems to be solved by embodiments are not limited to the above-described problem and may be variously extended in a range of technical ideas included in embodiments.

An embodiment provides a display device including a display part including a plurality of pixels; a lens part disposed on the display part, and a plurality of optical devices overlapping an edge of the display part and disposed at an edge of the lens part in a plan view, wherein light from an outside of the display part is incident on the plurality of optical devices.

The plurality of optical devices may include at least one camera.

The display part may include a first display area overlapping a central portion of the lens part in a plan view, and a second display area overlapping an edge portion of the lens part in a plan view.

The first display area may include a plurality of first pixels, the second display area may include a plurality of second pixels, and a density of the plurality of first pixels may be different from a density of the plurality of second pixels.

The density of the plurality of first pixels may be greater than the density of the plurality of second pixels.

The second display area may include a plurality of transmission areas in which the plurality of second pixels are not disposed and through which external light transmits.

The plurality of optical devices may overlap the second display area in a plan view, and the plurality of optical devices may overlap at least part of the plurality of transmission areas in a plan view.

The lens part may be divided into four sub-regions based on an imaginary cross-shaped line passing through a central portion of the lens part.

The plurality of optical devices may be disposed between two adjacent sub-regions among the four sub-regions.

The plurality of the optical devices may overlap in a plan view the imaginary cross-shaped line passing through the central portion of the lens part.

The display part may include a first display area overlapping a central portion of the lens part in a plan view; and a second display area overlapping an edge portion of the lens part in a plan view, the first display area may include a plurality of first pixels; the second display area may include a plurality of second pixels, and the density of the plurality of first pixels may be different from the density of the plurality of second pixels. ###

The density of the plurality of first pixels may be greater than the density of the plurality of second pixels.

The second display area may include a plurality of transmission areas in which the plurality of second pixels are not disposed and through which external light transmits.

The plurality of optical devices may overlap the second display area in a plan view, and the plurality of optical devices may overlap at least part of the plurality of transmission areas in a plan view.

An embodiment provides a display device including a frame; a head strap connected to the frame; a lens part installed in the frame; a display part disposed between the frame and the lens part and including a plurality of pixels; and a plurality of optical devices that overlap an edge of the display part in a plan view and are disposed at an edge of the lens part, and on which light from an outside of the display part is incident.

The plurality of optical devices may include at least one camera.

The display part may include a first display area overlapping a central portion of the lens part in a plan view; and a second display area overlapping an edge portion of the lens part in a plan view, the first display area may include a plurality of first pixels, the second display area may include a plurality of second pixels, and a density of the plurality of first pixels may be greater than a density of the plurality of second pixels.

The second display area may include a plurality of transmission areas in which the plurality of second pixels are not disposed and through which external light transmits, the plurality of optical devices may the second display area in a plan view, and the plurality of optical devices may overlap at least part of the plurality of transmission areas in a plan view.

The lens part may be divided into four sub-regions based on an imaginary cross-shaped line passing through a central portion thereof.

The plurality of optical devices may be disposed between two adjacent sub-regions among the four sub-regions.

The plurality of the optical devices may overlap in a plan view the imaginary cross-shaped line passing through the central portion of the lens part.

Another embodiment provides a display device including a frame; a head strap connected to the frame; a lens part installed in the frame; a display part disposed between the frame and the lens part and including a plurality of pixels; and a plurality of optical devices that overlap an edge of the display part and are disposed at an edge of the lens part, and on which light from an outside of the display part is incident.

According to the embodiments, it is possible to observe the outside together without interfering with an image of a head mounted display.

It is obvious that the effect of the embodiments is not limited to the above-described effect, and may be variously extended without departing from the spirit and scope of the embodiments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1:
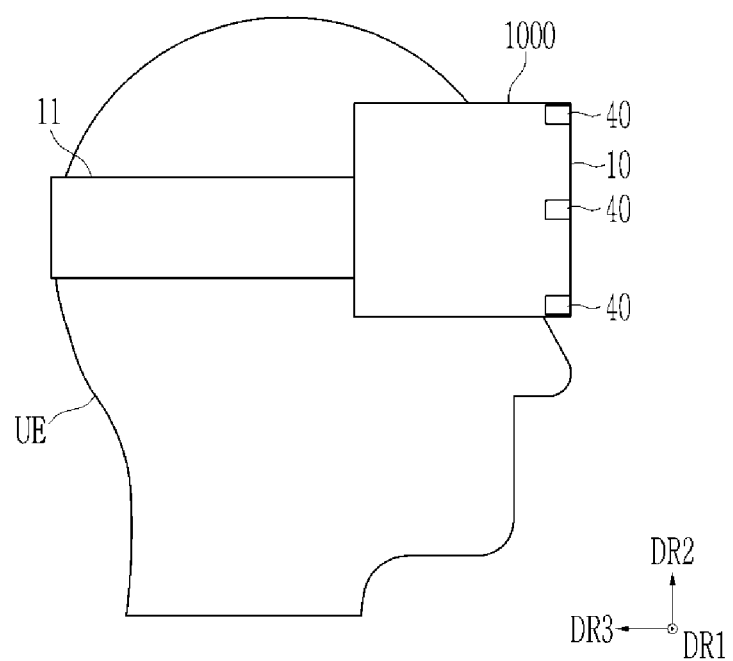
FIG. 1 illustrates a schematic view of a state in which a user mounts a display device according to an embodiment.

The embodiments will be described more fully hereinafter with reference to the accompanying drawings, in which embodiments are shown. As those skilled in the art would realize, the described embodiments may be modified in various different ways, all without departing from the spirit or scope of the embodiments.

In order to clearly describe the embodiments, parts or portions that are irrelevant to the description are omitted, and identical or similar elements throughout the specification are denoted by the same reference numerals.

Further, the accompanying drawings are provided only in order to allow embodiments disclosed in the specification to be readily understood and are not to be interpreted as limiting the spirit disclosed in the specification, and it is to be understood that the embodiments include all modifications, equivalents, and substitutions without departing from the scope and spirit of the embodiments.

Further, in the drawings, the size and thickness of each element may be arbitrarily illustrated for ease of description, and the disclosure is not necessarily limited to those illustrated in the drawings. In the drawings, the thicknesses of layers, films, panels, regions, areas, etc., may be exaggerated for clarity. In the drawings, for ease of description, the thicknesses of some layers and areas may be exaggerated.

It will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Furthermore, throughout the specification, "connected" does not only mean when two or more elements are directly connected, but also when two or more elements are indirectly connected through other elements, and when they are physically connected or electrically connected, and further, it may be referred to by different names depending on a position or function, and may also be referred to as a case in which respective parts that are substantially integrated are linked to each other.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, various embodiments and variations will be described in detail with reference to the drawings.

Figure 2:
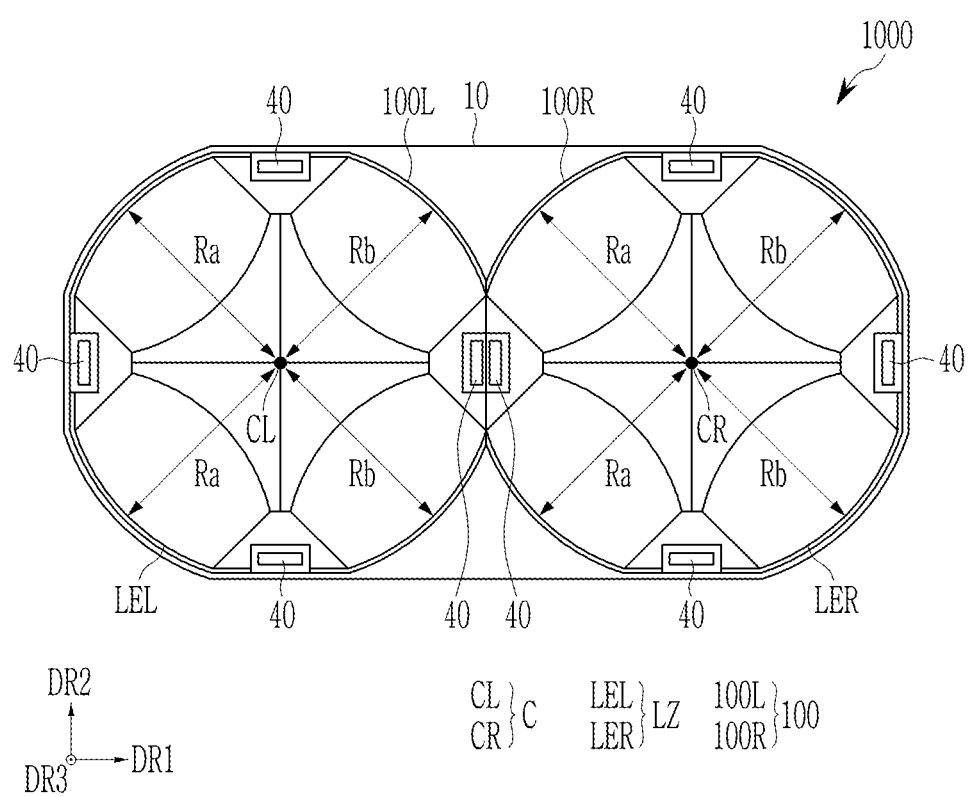
FIG. 2 illustrates a schematic plan view of a display device according to an embodiment.
Figure 3:
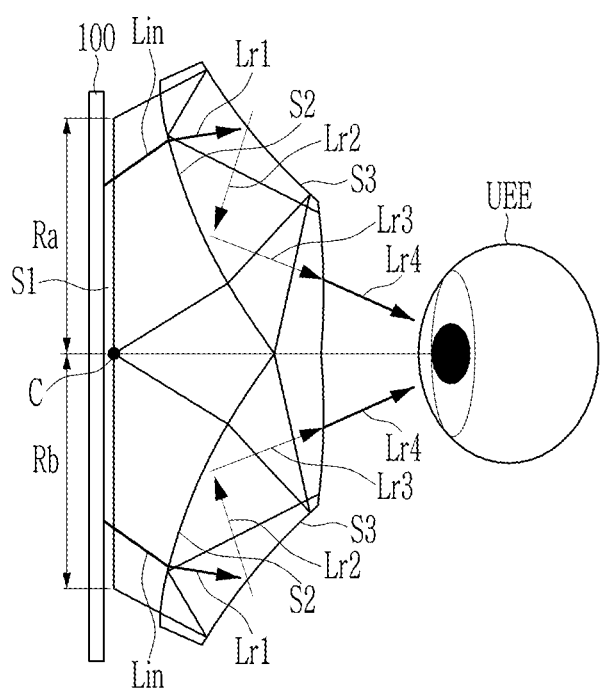
FIG. 3 illustrates a schematic side view of a portion of a display device according to an embodiment.

Now, a display device according to an embodiment will be described with reference to FIG. 1 to FIG. 3. FIG. 1 illustrates a schematic view of a state in which a user mounts a display device according to an embodiment, FIG. 2 illustrates a plan view of a display device according to an embodiment, and FIG. 3 illustrates a side view of a portion of a display device according to an embodiment.

Referring to FIG. 1, a display device 1000 according to an embodiment includes a frame 10, optical devices 40 mounted on the frame 10, and a head strap 11 connected to the frame 10.

A user UE may mount the frame 10 in front of eyes of the user UE by using the strap 11.

The frame 10 may be extended in a first direction DR1 and a second direction DR2 in front of the user UE.

The frame 10 may be disposed in front of the eyes of the user UE in a third direction DR3.

A lens part LZ and a display part 100, which will be described below, may be further disposed between the frame 10 and the user UE.

Referring to FIG. 2, the display device 1000 according to the embodiment includes the frame 10, the lens part LZ disposed on the frame 10, the display part 100 disposed between the frame 10 and the lens part LZ, and the optical devices 40 overlapping an edge of the lens part LZ (e.g., in a plan view).

The lens part LZ may include a first lens part LEL that may face the left eye of the user UE and a second lens part LER that may face the right eye of the user UE.

The display part 100 may include a first display part 100L overlapping the first lens part LEL and a second display part 100R overlapping the second lens part LER.

The first lens part LEL may include two first sub-regions Ra and two second sub-regions Rb divided in the first direction DR1 and the second direction DR2 with respect to a first central portion CL.

A first sub-region Ra and a second sub-region Rb of the first lens part LEL may be disposed one by one in a diagonal line passing through the first central portion CL and forming about 45 degrees with respect to the first direction DR1 and the second direction DR2.

The first lens part LEL may be divided into four regions based on an imaginary cross-shaped line passing through the first central portion CL of the first lens part LEL, and one of the two first sub-regions Ra and the two second sub-regions Rb may be disposed in each of the four regions.

An image of the first display part 100L corresponding to the two first sub-regions Ra and the second sub-region Rb may be refracted toward the first central portion CL of the first lens part LEL while passing through the first lens part LEL.

The second lens part LER may include two first sub-regions Ra and two second sub-regions Rb divided in the first direction DR1 and the second direction DR2 with respect to a second central portion CR.

A first sub-region Ra and a second sub-region Rb of the second lens part LER may be disposed one by one in a diagonal line passing through the second central portion CR and forming about 45 degrees with respect to the first direction DR1 and the second direction DR2.

The second lens part LER may be divided into four regions based on an imaginary cross-shaped line passing through the second central portion CR of the second lens part LER, and one of the two first sub-regions Ra and the two second sub-regions Rb may be disposed in each of the four regions.

An image of the second display part 100R corresponding to the two first sub-regions Ra and the second sub-regions Rb may be refracted toward the second central portion CR of the second lens part LER while passing through the second lens part LER.

The optical devices 40 may be disposed to overlap edge portions of the first display part 100L and the second display part 100R, and may be disposed between the first sub-region Ra and the second sub-region Rb adjacent to each other.

The optical devices 40 may be disposed to overlap an imaginary cross-shaped line passing through the first central portion CL of the first lens part LEL, and may be disposed to overlap an imaginary cross-shaped line passing through the second central portion CR of the second lens part LER.

For example, the four optical devices 40 disposed to overlap the edge portion of the first display part 100L may be disposed on the top, bottom, left, and right so as to overlap two center lines that pass through the first central portion CL and are parallel to the first direction DR1 and the second direction DR2. In addition, the four optical devices 40 disposed to overlap the edge portion of the second display part 100R may be disposed on the top, bottom, left, and right so as to overlap two center lines that pass through the second central portion CR and are parallel to the first direction DR1 and the second direction DR2.

The optical devices 40 may be inserted into the edge of the lens part LZ.

Hereinafter, a direction change of an image passing through the first sub-region Ra and the second sub-region Rb will be described with reference to FIG. 3 together with FIG. 2.

The lens part LZ includes a first boundary portion S1, a second boundary portion S2, and a third boundary portion S3 sequentially disposed in a direction from the display part 100 toward the user's eye UEE. The first boundary portion S1 may be a first surface of the flat lens part LZ facing the display part 100, the third boundary portion S3 may be a second surface of the lens part LZ facing the user's eye UEE, and the second boundary portion S2 may be a middle surface that is disposed between the first boundary portion S1 and the third boundary portion S3 and inclined to form an inclination with the first boundary portion S1 of the lens part LZ. In the central portion C of the lens part LZ, a distance between the second boundary portion S2 and the third boundary portion S3 is narrower than that between the first boundary portion S1 and the second boundary portion S2, and the distance between the second boundary portion S2 and the third boundary portion S3 may gradually increase from the central portion C of the lens part LZ toward the edge thereof and then decrease again.

Shapes of the lens part LZ disposed in the first sub-region Ra and the second sub-region Rb may be symmetrical with respect to the central portion C of the lens part LZ.

Light Lin that is emitted from the display part 100 and incident toward the lens part LZ is first refracted on the first boundary portion S1 of the lens part LZ so that a direction thereof is changed, and the first refracted first refraction light Lr1, the direction of which is changed, is first reflected on the second boundary portion S2 of the lens part LZ to be directed toward the central portion of the lens part LZ, and a direction thereof may be changed so that is becomes away from the eye UEE of the user UE. The first reflected first reflection light Lr2 is reflected again on the first boundary portion S1 of the lens part LZ so that a direction thereof is changed to be closer to the central portion of the lens part LZ and closer to the eyes UEE of the user UE, and the second-reflected second reflection light Lr3 of which direction is changed by being second reflected is second-refracted on the surface of the lens part LZ. The second refraction light Lr4 that is second-refracted on the surface of the lens part LZ is emitted to be directed toward the eye UEE of the user UE.

As such, the lens part LZ has two first sub-regions Ra and two second sub-regions Rb that are symmetrical to each other with respect to the central portion C thereof, and the lens part LZ disposed in each of the first sub-region Ra and the second sub-region Rb has the distances and thicknesses differently formed so that the distances between the first boundary portion S1, the second boundary portion S2, and the third boundary portion S3 are changed according to the positions thereof, so that the light Lin that is emitted from the display part 100 and incident toward the lens part LZ is changed to the first refraction light Lr1, the first reflection light Lr2, the second reflection light Lr3, and the second refraction light Lr4, and the direction thereof is changed to be directed toward the eye UEE of the user UE, thereby displaying a three-dimensional image.

Therefore, by adjusting the distances between the boundary portions S1, S2, and S3 of the lens part LZ without an additional element other than the display part 100 and the lens part LZ, since it is possible to display a three-dimensional image, the thickness of the display device 1000 measured in the third direction DR3 may be reduced, so that the volume and weight thereof may be reduced, and accordingly, the user UE may readily mount the display device 1000.

Figure 4:
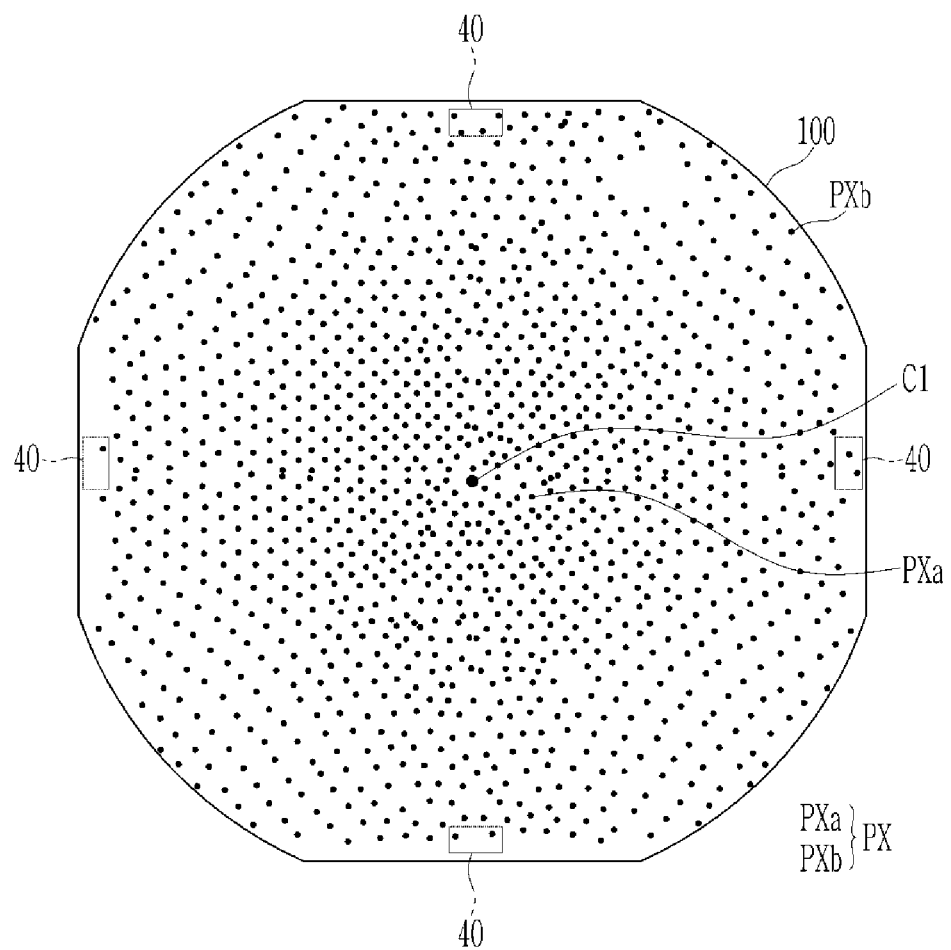
FIG. 4 illustrates a schematic plan view of an example of disposition of a pixel of a display device according to an embodiment.
Figure 5:
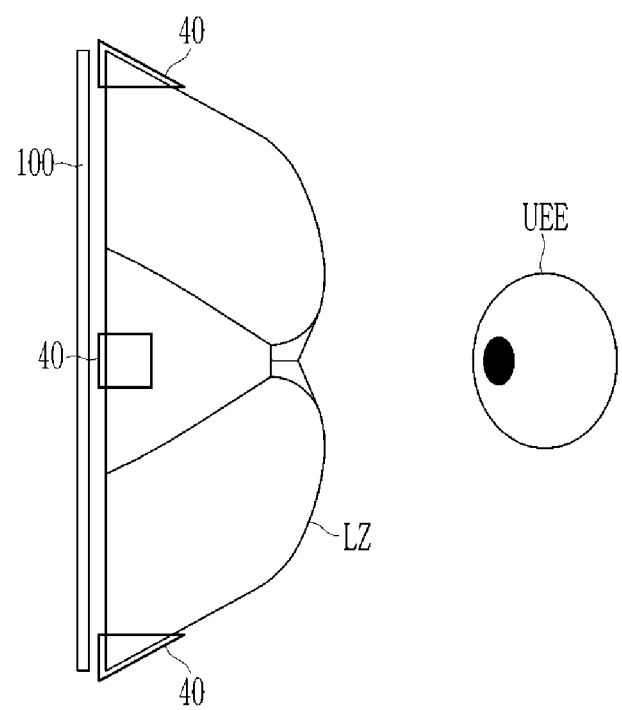
FIG. 5 illustrates a schematic side view of a display device according to an embodiment.

Hereinafter, disposition of a pixel of the display part 100 of the display device 1000 and positions of the optical devices 40 according to the embodiment will be described with reference to FIG. 4 and FIG. 5 along with FIG. 1 to FIG. 3. FIG. 4 illustrates a plan view of an example of disposition of a pixel of a display device according to an embodiment, and FIG. 5 illustrates a side view of a display device according to an embodiment.

Referring to FIG. 4, the display part 100 of the display device 1000 according to the embodiment may include pixels PX.

The pixels PX of the display part 100 may include first pixels PXa and second pixels PXb.

The first pixels PXa may be disposed adjacent to the central portion C1 of the display part 100, and the second pixels PXb may be disposed adjacent to the edge portion of the display part 100.

A density of the first pixels PXa may be larger than that of the second pixels PXb. A periphery in which the second pixels PXb are disposed may form a transmission area TA through which external light is transmitted without the pixel PX being disposed.

A portion in which the first pixels PXa is disposed may form a first display area DA1 to be described below, and a portion in which the second pixels PXb are disposed may form a second display area DA2 to be described below.

The optical devices 40 may be disposed to overlap the edge portion of the display part 100, and may be disposed to overlap the portion in which the second pixels PXb are disposed.

For example, the four optical devices 40 disposed to overlap the edge portion of the display part 100 may be disposed on the top, bottom, left, and right so as to overlap two center lines that pass through the central portion C and are parallel to the first direction DR1 and the second direction DR2.

The optical device 40 is disposed to overlap second pixels PXb disposed to have a relatively low density, so that at least a portion thereof may overlap at least a portion of the transmission area TA in which the pixel PX is not disposed.

Figure 6:
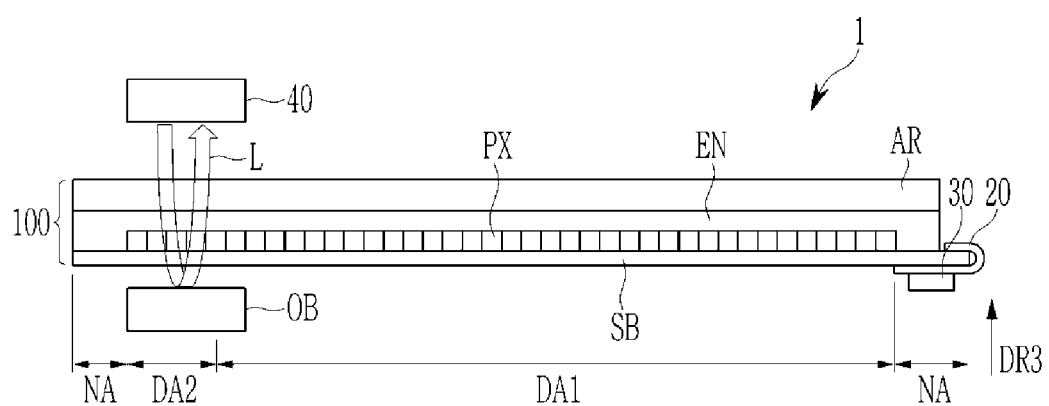
FIG. 6 illustrates a schematic cross-sectional view of a display part of a display device according to an embodiment.
Figure 7:
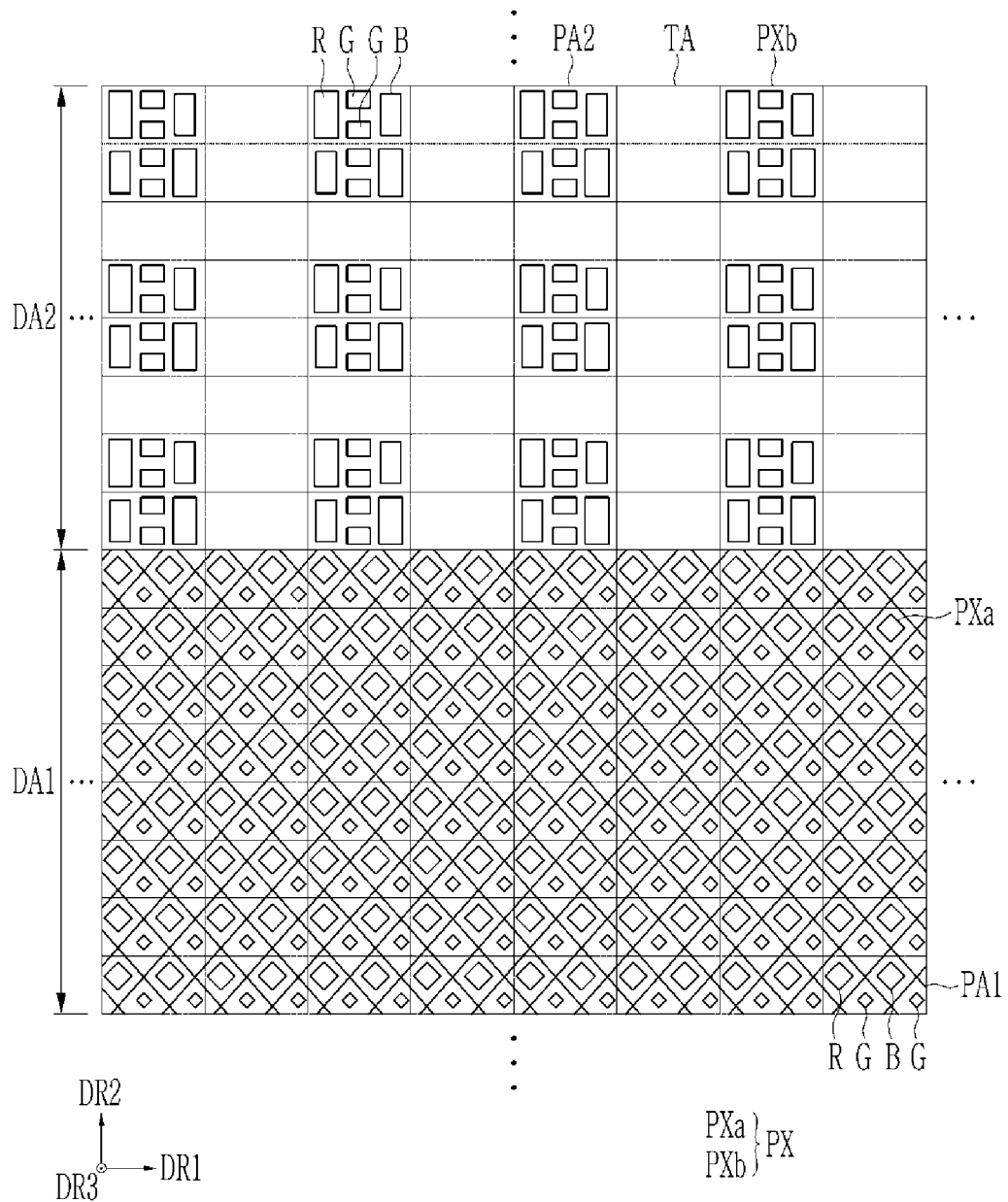
FIG. 7 illustrates a schematic layout view of a portion of a first display area and a second display area of a display part of a display device according to an embodiment.

Hereinafter, the positions of the optical device 40 and the display part 100 will be described in more detail with reference to FIG. 6 and FIG. 7. FIG. 6 illustrates a schematic cross-sectional view of a display part of a display device according to an embodiment, and FIG. 7 illustrates a schematic layout view of a portion of a first display area and a second display area of a display part of a display device according to an embodiment.

First, referring to FIG. 6, the display part 100 may include a display area DA in which an image is displayed and a non-display area NA that is disposed to surround the display area DA and does not display an image. The display area DA may correspond to a screen.

Pixels PX are disposed in the display area DA. Here, the pixel PX is a minimum unit for displaying an image, and each pixel PX may display a specific color, for example, one of red, green, and blue colors according to an input image signal, with various luminances.

Circuits and/or signal lines for generating and/or transmitting various signals to be applied to the display area DA are disposed in the non-display area NA. Signal lines such as a gate line, a data line, and a driving voltage line are connected to each pixel PX, and the pixel PX may receive a gate signal, a data voltage, a driving voltage, and the like from these signal lines.

The display area DA includes a first display area DA1 and a second display area DA2. The second display area DA2 has higher transmittance than the first display area DA1 so that it may perform other functions in addition to a unique function of displaying an image. Here, the transmittance means transmittance of light passing through the display part 100 in the third direction DR3. The light may be visible light and/or light with a wavelength other than visible light (for example, infrared light).

The second display area DA2 has a smaller density than that of the pixels PX than the first display area DA1, that is, the number of the pixels PX per unit area. More specifically, the first pixels PXa having a relatively high density may be disposed in the first display area DA1, and the second pixels PXb having a relatively low density may be disposed in the second display area DA2.

The second display area DA2 may be disposed in contact with the non-display area NA, for example, may be disposed along an edge of the display area DA.

A driving unit that generates and/or processes various signals for driving the display part 100 may be disposed in the non-display area NA of the display part 100. The driving unit may include a data driver for applying a data voltage to data lines, a gate driver for applying a gate signal to gate lines, and a signal controller for controlling the data driver and the gate driver.

The driving unit may be integrated in the display part 100, and may be disposed at both left and right sides or one side of the display area DA. The data driver and the signal controller may be provided as an integrated circuit chip (also referred to as a driving IC chip) 30, and the integrated circuit chip 30 may be mounted on a flexible printed circuit film 20 to be electrically connected to the display part 100. The integrated circuit chip 30 may be mounted in the non-display area NA of the display part 100.

The display part 100 may include a substrate SB, and the pixels PX may be formed on the substrate SB. The substrate SB may be entirely and continuously disposed on the first display area DA1 and the second display area DA2.

The display part 100 may include an encapsulation layer EN that entirely covers (or overlaps, e.g., in a plan view) the pixels PX. The encapsulation layer EN may seal the first display area DA1 and the second display area DA2 to prevent moisture or oxygen from penetrating into the display part 100.

An anti-reflection layer AR for reducing reflection of external light may be disposed on the encapsulation layer EN. The anti-reflection layer AR may include a light blocking member and a color filter, but they may be omitted.

The optical devices 40 may be disposed to overlap the second display area DA2 of the display part 100 at the first surface of the display part 100.

The optical device 40 may emit light L of a wavelength range (e.g., a predetermined or selected wavelength range) toward an object OB disposed at a side of the second surface facing the first surface of the display part 100 or receive the light L reflected on the object OB. The light L of a wavelength range is light of a wavelength that may be processed by the optical device 40, and it may be visible light and/or infrared light, and light of a wavelength may mainly pass through a transmission area disposed in the second display area DA2. For example, when the optical device 40 uses infrared light, the light of a wavelength may have a wavelength range of about 900 nm to 1000 nm. The optical device 40 may receive light of a wavelength irradiated to a front surface of the display part 100.

The first display area DA1 includes first pixel areas PA1 including the first pixels PXa, and the second display area DA2 includes second pixel areas PA2 including the second pixels PXb and transmission areas TA.

A size of one first pixel area PA1 and a size of one second pixel area PA2 may be different from each other, but the embodiment is not limited thereto, and a size of one first pixel area PA1 and a size of one second pixel area PA2 may be the same.

Each of the pixel areas PA1 and PA2 may include at least one pixel PX. The pixel PX may include a pixel circuit and a light emitting part. The pixel circuit is a circuit for driving a light emitting element such as a light emitting diode (LED), and may include a transistor, a capacitor, and the like. The light emitting part is an area from which light emitted from the light-emitting element is emitted. In addition, in the second display area DA2, the pixel circuit may be disposed in the non-display area, and the pixel circuit may be disposed in a separate space disposed in the first display area DA1. The pixel circuit and the second pixel areas PA2 may be connected to each other through a connection wire made of a transparent metal, so that efficiency of the optical device may be increased.

Each pixel PX may correspond to the light emitting part. The light emitting part may have various shapes, such as a rhombus shape, a rectangular shape, and a circular shape. The pixel PX may emit light in a direction, that is, the third direction DR3.

The transmission area TA does not include a circuit and a light emitting part. Since a pixel circuit, a light emitting part, and the like that block light transmission are not disposed or are hardly disposed in the transmission area TA, transmittance thereof is higher than that of the first pixel areas PA1 and the second pixel areas PA2.

In an embodiment, each first pixel area PA1 includes one red pixel R, two green pixels G, and one blue pixel B. Each second pixel area PA2 includes one red pixel R, two green pixels G, and one blue pixel B.

The disposition of the red pixel R, the green pixel G, and the blue pixel B in the first pixel area PA1 and the disposition of the red pixel R, the green pixel G, and the blue pixel B in the second pixel area PA2 may be different from each other, and the sizes of the red pixel R, green pixel G, and blue pixel B in the first pixel area PA1 and the sizes of the red pixel R, green pixel G, and blue pixel B in the second pixel area PA2 may be different from each other. Unlike the illustrated structure, the pixel disposition of the first pixel area PA1 and the pixel disposition of the second pixel area PA2 may be the same.

In case that a set of pixels R, G, and B included in each of the pixel areas PA1 and PA2 is referred to as a unit pixel, the configuration of the unit pixel of the first pixel area PA1 and the configuration of the unit pixels of the second pixel area PA2 may be the same or different. The unit pixel may include one red pixel R, one green pixel G, and one blue pixel B. The unit pixel may include at least one of the red pixel R, the green pixel G, and the blue pixel B, and may include a white pixel.

The pixels R, G, and B included in the first display area DA1 form a pixel row in the first direction DR1. In each pixel row in the first display area DA1, the pixels R, G, and B are substantially arranged in a line in the first direction DR1. In each pixel row, the pixels R, G, and B may be repeatedly arranged in an order of the red pixel R, the green pixel G, the blue pixel B, and the green pixel G in the first direction DR1. The disposition of the pixels R, G, and B included in one pixel row may be variously changed. For example, the pixels R, G, and B may be repeatedly arranged in an order of the blue pixel B, the green pixel G, the red pixel R, and the green pixel G or an order of the pixel R, the blue pixel B, the green pixel G, and the blue pixel B, in the first direction DR1.

In each pixel row in the second display area DA2, the pixels R, G, and B are substantially arranged in a line in the first direction DR1. In each pixel row, the pixels R, G, and B are arranged such that one red pixel R, two green pixels G, and one blue pixel B are repeatedly arranged in the first direction DR1. The disposition of the pixels R, G, and B included in one pixel row may be variously changed. In the second display area DA2, each pixel PX may have a rectangular planar shape.

A planar size of the green pixel G may be smaller than that of the blue pixel B and that of the red pixel R.

The pixels R, G, and B of the first pixel area PA1 and the second pixel area PA2 also form a pixel column in the second direction DR2. In each pixel column, the pixels R, G, and B are substantially arranged in a line in the second direction DR2. In each pixel column, the pixels PX of the same color may be disposed, and the pixels PX of two or more colors may be alternately disposed in the second direction DR2. The disposition of the pixels R, G, and B included in a pixel column may be variously changed.

Each of the pixels R, G, and B may be a single-sided emission type, for example, a top emission type that emits light in the third direction DR3. The pixels R, G, and B of the second pixel area PA2 may be a bottom emission type or a double-sided emission type.

The optical devices 40 may include a video camera for see-through, a depth camera for finger tracking used for gesture recognition, and a camera for spatial recognition.

The optical device 40 may be a camera, a sensor, or a flash, and in case that the optical device 40 is a sensor, the optical device 40 may be a proximity sensor or an illuminance sensor. Light of a wavelength used by the optical device 40 may pass through the display part 100 with a higher transmittance through the second display area DA2.

As such, the display device 1000 may include the optical device 40 overlapping the second display area DA2 of the display part 100, and the optical device 40 may overlap at least a portion of the transmission area TA of the second display area DA2. Accordingly, the optical device 40 allows the user UE to grasp and use an external state by using light and image that display an image displayed on the display part 100 and at the same time are incident through the transmission area TA from the outside.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
a display part including a plurality of pixels;
a lens part disposed on the display part; and
a plurality of optical devices overlapping an edge of the display part in a plan view and disposed at an edge of the lens part,
wherein light originating from an outside of the display device is incident on the plurality of optical devices, and
wherein the plurality of the optical devices overlap in a plan view an imaginary cross-shaped line passing through a central portion of the lens part.

2. The display device of claim 1, wherein the plurality of optical devices include at least one camera.

3. The display device of claim 2, wherein
the display part includes:
a first display area overlapping the central portion of the lens part in a plan view; and
a second display area overlapping an edge portion of the lens part in a plan view;
the first display area includes a plurality of first pixels,
the second display area includes a plurality of second pixels, and
a density of the plurality of first pixels is different from a density of the plurality of second pixels.

4. The display device of claim 3, wherein the density of the plurality of first pixels is greater than the density of the plurality of second pixels.

5. The display device of claim 4, wherein the second display area includes a plurality of transmission areas in which the plurality of second pixels are not disposed and through which light external to the display device transmits.

6. The display device of claim 5, wherein
the plurality of optical devices overlap the second display area in a plan view, and
the plurality of optical devices overlap at least part of the plurality of transmission areas in a plan view.

7. The display device of claim 1, wherein the lens part is divided into four sub-regions based on the imaginary cross-shaped line passing through the central portion of the lens part.

8. The display device of claim 7, wherein the plurality of optical devices are disposed between two adjacent sub-regions among the four sub-regions.

9. The display device of claim 1, wherein
the display part includes:
a first display area overlapping the central portion of the lens part in a plan view; and
a second display area overlapping an edge portion of the lens part in a plan view;
the first display area includes a plurality of first pixels,
the second display area includes a plurality of second pixels, and
the density of the plurality of first pixels is different from the density of the plurality of second pixels.

10. The display device of claim 9, wherein the density of the plurality of first pixels is greater than the density of the plurality of second pixels.

11. The display device of claim 10, wherein the second display area includes a plurality of transmission areas in which the plurality of second pixels are not disposed and through which external light transmits.

12. The display device of claim 11, wherein
the plurality of optical devices overlap the second display area in a plan view, and
the plurality of optical devices overlap at least part of the plurality of transmission areas in a plan view.

13. The display device of claim 1, wherein the optical devices are capable of sensing external light at least one of finger tracking and spatial recognition.

14. A display device comprising:
a frame;
a head strap connected to the frame;
a lens part installed in the frame;
a display part disposed between the frame and the lens part and including a plurality of pixels; and
a plurality of optical devices that overlap an edge of the display part in a plan view and are disposed at an edge of the lens part, and on which light originating from an outside of the display device is incident, and
wherein the plurality of the optical devices overlap in a plan view an imaginary cross-shaped line passing through a central portion of the lens part.

15. The display device of claim 14, wherein the plurality of optical devices include at least one camera.

16. The display device of claim 15, wherein
the display part includes:
a first display area overlapping the central portion of the lens part in a plan view; and
a second display area overlapping an edge portion of the lens part in a plan view,
the first display area includes a plurality of first pixels,
the second display area includes a plurality of second pixels, and
a density of the plurality of first pixels is greater than a density of the plurality of second pixels.

17. The display device of claim 16, wherein
the second display area includes a plurality of transmission areas in which the plurality of second pixels are not disposed and through which external light transmits,
the plurality of optical devices overlap the second display area in a plan view, and
the plurality of optical devices overlap at least part of the plurality of transmission areas in a plan view.

18. The display device of claim 17, wherein the lens part is divided into four sub-regions based on the imaginary cross-shaped line passing through the central portion of the lens part.

19. The display device of claim 18, wherein the plurality of optical devices are disposed between two adjacent sub-regions among the four sub-regions.

* * * * *